US 7,778,795 B2

(12) United States Patent
Fukushima et al.

(10) Patent No.: US 7,778,795 B2
(45) Date of Patent: Aug. 17, 2010

(54) POSITION INDICATOR, VARIABLE CAPACITOR, POSITION INPUT DEVICE AND COMPUTER SYSTEM

(75) Inventors: Yasuyuki Fukushima, Kitakatsushika-gun (JP); Hiroyuki Fujitsuka, Kitakatsushika-gun (JP)

(73) Assignee: Wacom Co., Ltd., Saitama (JP)

( * ) Notice: Subject to any disclaimer, the term of this patent is extended or adjusted under 35 U.S.C. 154(b) by 91 days.

(21) Appl. No.: 12/233,238

(22) Filed: Sep. 18, 2008

(65) Prior Publication Data
US 2009/0076770 A1    Mar. 19, 2009

(30) Foreign Application Priority Data
Sep. 18, 2007   (JP) .............................. 2007-241256

(51) Int. Cl.
*G06F 15/00* (2006.01)
(52) U.S. Cl. ..................................... 702/150
(58) Field of Classification Search ................. 702/150; 178/19.03; 324/207.16
See application file for complete search history.

(56) References Cited

U.S. PATENT DOCUMENTS

| 4,878,553 A | 11/1989 | Yamanami |
| 5,206,785 A | 4/1993 | Hukashima |
| 6,853,369 B2 | 2/2005 | Fukushima |
| 2007/0180923 A1 | 8/2007 | Liu |
| 2008/0180092 A1 * | 7/2008 | Fukushima et al. .... 324/207.16 |

FOREIGN PATENT DOCUMENTS

| JP | 63-70326 A | 3/1988 |
| JP | 4-96212 A | 3/1992 |
| JP | 5-275283 A | 10/1993 |
| JP | 3071553 B2 | 7/2000 |
| JP | 3150685 B2 | 3/2001 |
| JP | 2001-319831 A | 11/2001 |

\* cited by examiner

*Primary Examiner*—Bryan Bui
(74) *Attorney, Agent, or Firm*—Seed IP Law Group PLLC

(57) ABSTRACT

A position indicator (100) has a variable capacitor 200, a resonant circuit (36) configured with a position indicating coil (13) and a resonant capacitor (15*a*), and a rod (11). The variable capacitor (200) has a flat disc-shaped dielectric (1) having two mutually opposite surfaces (1*a*, 1*b*), an electrode (2) provided on one surface (1*a*) of the dielectric (1), a hole (1*c*) extending between the two mutually opposite surfaces of the dielectric, a conductive portion electrically connecting both ends of the hole, and a conductive elastic member (3) provided near the other surface (1*b*) of the dielectric (1). The conductive elastic member (3) is arranged on one end of the rod (11). When a pen pressure in the direction of arrow "a" is applied to the other end of the rod (11), the conductive elastic member (3) is pressed against the dielectric (1) so as to be flattened, and the capacitance of the variable capacitor (200) changes in response to the change in the contact area between the conductive elastic member (3) and the dielectric (1).

18 Claims, 10 Drawing Sheets

POSITION INDICATOR, VARIABLE CAPACITOR, POSITION INPUT DEVICE AND COMPUTER SYSTEM

CROSS REFERENCES TO RELATED APPLICATIONS

The present application claims priority under 35 U.S.C. §119 from Japanese Patent Application JP 2007-241256 filed in the Japanese Patent Office on Sep. 18, 2007, the entire contents of which is incorporated herein by reference.

BACKGROUND OF THE INVENTION

1. Field of the Invention

The present invention relates to a position indicator for use with a digitizer adapted to input position information, a variable capacitor suitably used in the position indicator, a position input device including the position indicator and a digitizer, and a computer system using the position input device, particularly in which the structure of the variable capacitor used in a pen pressure detecting section of the position indicator is simplified and therefore the radial dimension of the position indicator is reduced.

2. Description of the Related Art

A variable capacitor is conventionally used in a pen pressure detecting section of a position indicator for an electromagnetic induction type position input device (see Japanese Patent No. 3150685, incorporated by reference herein, for example). Examples of such a variable capacitor include the one in which an electrode on one surface of the variable capacitor is divided into two parts so that signals may be easily accessed from only one surface, as opposed to from both surfaces, of the variable capacitor (see, for example, Japanese Unexamined Patent Application Publication No. 2001-319831, corresponding to U.S. Pat. No. 6,853,369, incorporated by reference herein). However, both the variable capacitor disclosed in Japanese Patent No. 3150685 and the variable capacitor disclosed in Japanese Unexamined Patent Application Publication No. 2001-319831 require a large number of components.

Figure 10A:
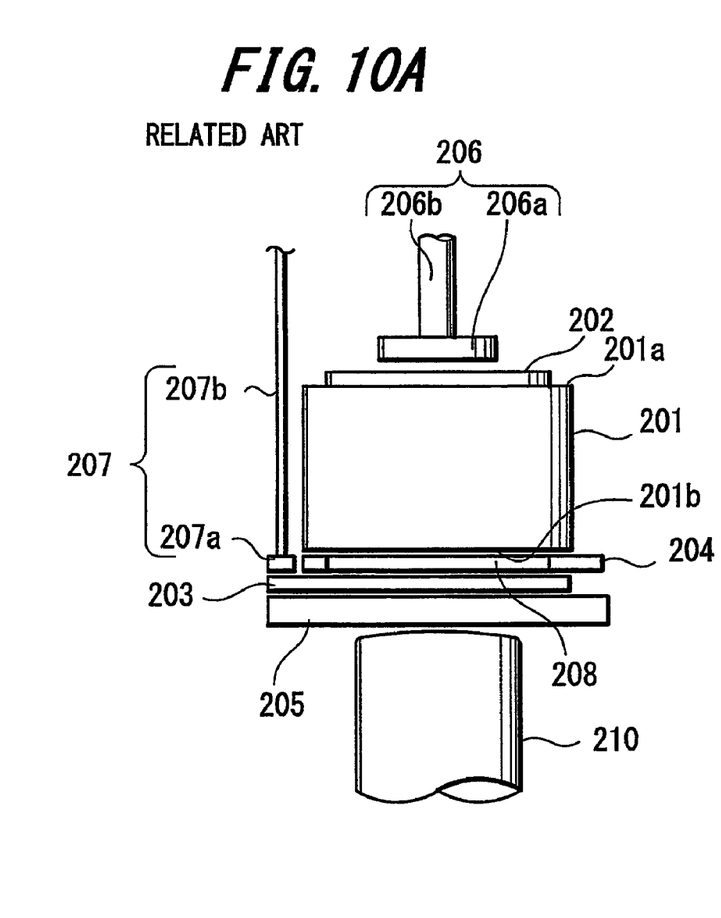
FIGS. 10A and 10B show a known variable capacitor.
Figure 10B:
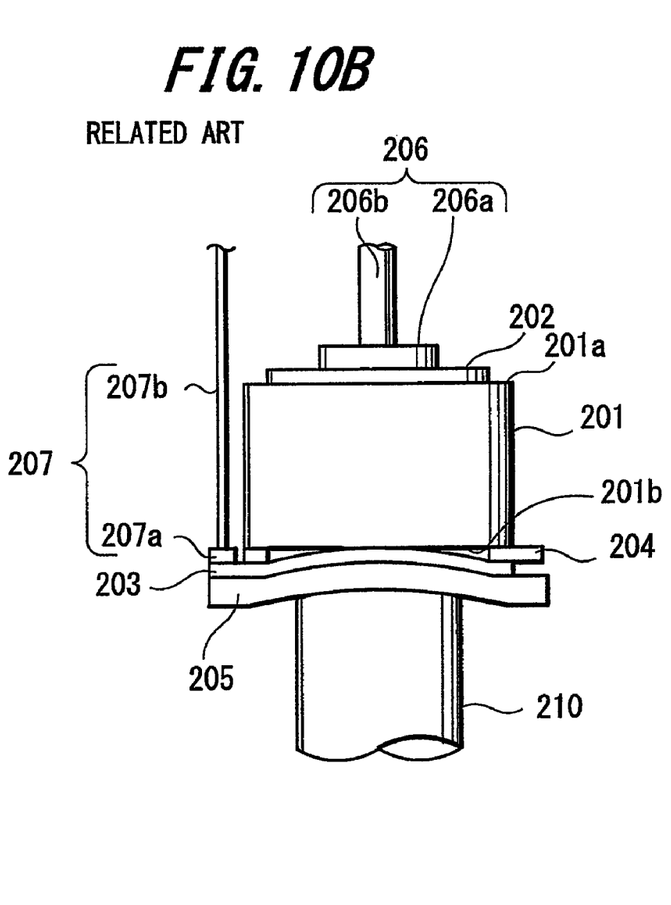

FIGS. 10A and 10B show a concrete configuration of a variable capacitor disclosed in Japanese Patent No. 3150685. As shown in FIGS. 10A and 10B, the variable capacitor includes a dielectric 201, a first electrode 202, a second electrode 203, a ring-shaped spacer 204, an elastic body 205, two terminals 206 and 207, and a rod 210. The dielectric 201 is made of a hard material and is substantially formed in a disc shape having two surfaces 201a and 201b extending in parallel with each other. Hereinafter the surface 201a is referred to as "one surface 201a", and the surface 201b is referred to as "the other surface 201b". For example, the dielectric 201 is made of a ceramic material having a thickness of 2 mm, a diameter of 4.6 mm, and a relative dielectric constant (or relative permittivity) of 7000. The first electrode 202 is provided on the one surface 201a of the dielectric 201. The other surface 201b of the dielectric 201 is smoothly polished to a surface roughness (Ra) of 0.1 μm or less.

The first electrode 202 is made of a substantially disc-shaped silver plate having a thickness of 0.2 mm and a diameter of 4.0 mm. Further, the first electrode 202 is sintered onto the one surface 201a of the dielectric 201. The second electrode 203 is a flexible insulating film, for example. The second electrode 203 is formed, for example, by vapor-depositing a nichrome to a thickness of 1000 angstrom on a polyimide film having a thickness of 75 μm. The second electrode 203 includes a disc-shaped electrode portion having a diameter of 4.6 mm, and a terminal portion extending from the electrode portion into a tongue shape (the left-hand side portion of the second electrode 203 as shown in FIGS. 10A and 10B).

The spacer 204 is made of a polyimide film having a thickness of 40 μm and a relative dielectric constant of 3.5. The spacer 204 includes a ring-shaped main body having an outer diameter of 4.6 mm and an inner diameter of 3.3 mm, and an engaging portion extending from the main body into a tongue shape (the right-hand side portion of the spacer 204 as shown in FIGS. 10A and 10B). The elastic body 205 is made of, for example, a silicon rubber having a thickness of 0.35 mm. The elastic body 205 includes a disc-shaped main body having a diameter of 4.6 mm and two engaging portions. The two engaging portions respectively extend from two places opposite to each other in the radial direction of the main body into two tongue shapes (the right-hand and left-hand side portions of the elastic body 205 as shown in FIGS. 10A and 10B).

The terminals 206 and 207 respectively include disc-shaped electrode portions 206a and 207a and cylindrical lead portions 206b and 207b. The lead portions 206b and 207b respectively extend from the center of one surface of the electrode portions 206a and 207a in a direction perpendicular to the plate surface of the electrode portions 206a and 207a. The lead portions 206b and 207b are formed by plating nickel and gold on the surface of brass. When pen pressure is applied, the other surfaces of the electrode portions 206a and 207a are respectively brought into electrical connection with the first electrode 202 and the second electrode 203.

As shown in FIG. 10A, in a state where there is no pressure or displacement applied to the rod 210 (namely, in a state where the variable capacitor is in the initial state), the other surface 201b of the dielectric 201 and the second electrode 203 are spaced apart from each other by the spacer 204 by a distance equal to the thickness of the spacer 204, except for the peripheral portion. As a result, an air layer 208 is formed between the dielectric 201 and the second electrode 203. The capacitance value (the initial capacitance) between the terminal 206 and the terminal 207 is substantially a combined capacitance obtained by series-connecting the capacitance contributed by the dielectric 201 with capacitance contributed by the air layer 208 having a relative dielectric constant of 1.0, and therefore the combined capacitance is very small.

However, if a pressure or a displacement is applied to the rod 210, such a pressure or displacement will be applied to the second electrode 203 through the elastic body 205. As a result, the second electrode 203 will be bent toward the other surface 201b of the dielectric 201. Consequently, the thickness of the air layer 208 will become smaller than the thickness of the spacer 204. Since the capacitance contributed by the air layer 208 increases in inverse proportion to the thickness of the air layer 208, if the thickness of the air layer 208 decreases, the capacitance contributed by the air layer 208 will increase, and therefore the capacitance between the terminal 206 and the terminal 207 will increase.

After that, as shown in FIG. 10B, if the pressure or displacement applied to rod 210 increases to an extent such that the second electrode 203 is brought into contact with the other surface 201b of the dielectric 201, the capacitance in the electrode-dielectric contact area will become exactly the capacitance contributed by the dielectric 201 only. Thus, the capacitance value between the terminal 206 and the terminal 207 increases substantially in proportion to the size of the contact area. In such a manner, the capacitance value of the aforesaid variable capacitor changes largely in response to a pressure or a very small displacement applied to one end of the rod 210.

SUMMARY OF THE INVENTION

However, as can be seen in FIG. 10A, it is obvious that the aforesaid variable capacitor needs to be configured with a large number of components. Further, since a double-housing is used in the variable capacitor disclosed in Japanese Patent No. 3150685 (refer to FIG. 2 of Japanese Patent No. 3150685), it is difficult to reduce the outer diameter of the variable capacitor. Further, since a precision forming process needs to be employed to produce the double-housing, a clean booth will be indispensable in the production process. As a result, the double-housing turns out to be a factor that increases the manufacturing cost.

Compared to the aforesaid configuration, in the variable capacitor disclosed in Japanese Unexamined Patent Application Publication No. 2001-319831, two connection terminals are arranged on one surface side of a dielectric so that the device can be simplified. However, an initial capacitance is generated between two divided electrodes. Accordingly, there might be less than optimal characteristics, such as a not small enough initial capacitance, associated with the variable capacitor disclosed in Japanese Unexamined Patent Application Publication No. 2001-319831.

In view of the aforesaid problems, one of objects of the present invention is to simplify the configuration of the variable capacitor to reduce a radial dimension of the position indicator, and to reduce the initial capacitance of the variable capacitor.

A position indicator according to a first aspect of the present invention includes: a variable capacitor; a resonant circuit configured with a position detecting coil and a capacitor connected with the variable capacitor; and a rod passing through the position detecting coil. The variable capacitor includes a dielectric having two mutually opposite surfaces, and an electrode having a predetermined area is arranged on one surface of the dielectric. A hole is provided to penetrate the two mutually opposite surfaces of the dielectric, and a conductive portion is provided to electrically connect both ends of the hole to one another. A conductive elastic member is arranged near the other surface of the dielectric, and one end of the rod is connected to the conductive elastic member, while the other end of the rod serves as a position-indicating point (e.g., as a stylus pen tip).

In accordance with various exemplary embodiments, in the aforesaid position indicator, the conductive portion is formed by inserting a conductive pin into the hole. Further in accordance with various exemplary embodiments, in the aforesaid position indicator, one end portion of the conductive pin in a longitudinal direction is provided with a flat pin head portion, and the other surface of the dielectric is provided with a stepped portion recessed around the hole, the depth of the stepped portion being equal to or slightly greater than the thickness of the pin head portion. Still further in accordance with various exemplary embodiments, in the aforesaid position indicator, the conductive portion is formed by forming a conductive layer on an inner wall of the hole. Additionally, in accordance with various exemplary embodiments, in the aforesaid position indicator, a contact area of the conductive elastic member and the dielectric changes in response to a pen pressure applied to the rod.

A variable capacitor according to a second aspect of the present invention includes: a dielectric having two mutually opposite surfaces; an electrode arranged on one surface of the dielectric and having a predetermined area; a hole penetrating the two mutually opposite surfaces of the dielectric; a conductive portion electrically connecting both ends of the hole to one another; and a conductive elastic member arranged near the other surface of the dielectric.

In one aspect of the aforesaid variable capacitor, the conductive portion is formed by inserting a conductive pin into the hole. In another aspect of the aforesaid variable capacitor, one end portion of the conductive pin in a longitudinal direction is provided with a flat pin head portion, and the other surface of the dielectric is provided with a stepped portion recessed around the hole, the depth of the stepped portion being equal to or slightly greater than the thickness of the pin head portion. In still another aspect of the aforesaid variable capacitor, the conductive portion is formed by forming a conductive layer on the inner wall of the hole. In a still further aspect of the aforesaid variable capacitor, the conductive elastic member has a predetermined hardness. In yet another aspect of the aforesaid variable capacitor, the dielectric has a flat shape.

A position input device according to a third aspect of the present invention includes a position indicator and a position detector, wherein the position indicator includes: a variable capacitor; a resonant circuit configured with a position detecting coil and a capacitor connected with the variable capacitor; and a rod passing through the position detecting coil. The variable capacitor has a dielectric having two mutually opposite surfaces, and an electrode having a predetermined area is arranged on one surface of the dielectric. A hole is provided to penetrate the two mutually opposite surfaces of the dielectric, and a conductive portion is provided to electrically connect both ends of the hole to one another. A conductive elastic member is arranged near the other surface of the dielectric, and one end of the rod is connected to the conductive elastic member, while the other end of the rod serves as a position-indicating point. The position detector detects, near the position-indicating point, signals transmitted from the position detecting coil.

A computer system according to a fourth aspect of the present invention includes a position indicator and a position detector, wherein the position indicator includes: a variable capacitor; a resonant circuit configured with a position detecting coil and a capacitor connected with the variable capacitor; and a rod passing through the position detecting coil. The variable capacitor has a dielectric having two mutually opposite surfaces, and an electrode having a predetermined area is arranged on one surface of the dielectric. A hole is provided to penetrate the two mutually opposite surfaces of the dielectric, and a conductive portion is provided to electrically connect both ends of the hole to one another. A conductive elastic member is arranged near the other surface of the dielectric, and one end of the rod is connected to the conductive elastic member, while the other end of the rod serves as a position-indicating point. The position detector detects, near the position-indicating point, signals transmitted from the position detecting coil. The computer system, using a central processing unit, converts a pen pressure detected by the variable capacitor into a data signal. In some embodiments, a pen pressure is reflected in the phase difference between a signal transmitted from the position detector and the signal received by the position detector from the resonant circuit. In other embodiments, a pen pressure is reflected in a number of waves generated by the resonant circuit during a certain time period.

According to the present invention, the configuration of the variable capacitor can be simplified so as to reduce the radial dimension of the position indicator, and reduce the initial capacitance of the variable capacitor. Accordingly, it is possible to provide a superior variable capacitor, a superior position indicator, a superior position input device and a superior computer system.

DETAILED DESCRIPTION OF THE PREFERRED EMBODIMENT(S)

A first embodiment of the present invention will be described below with reference to FIGS. 1 to 8. Firstly, a configuration of an exemplary embodiment of a position indicator including a variable capacitor, and a position input device, according to the present invention, will be described below with reference to FIG. 1.

Figure 1:
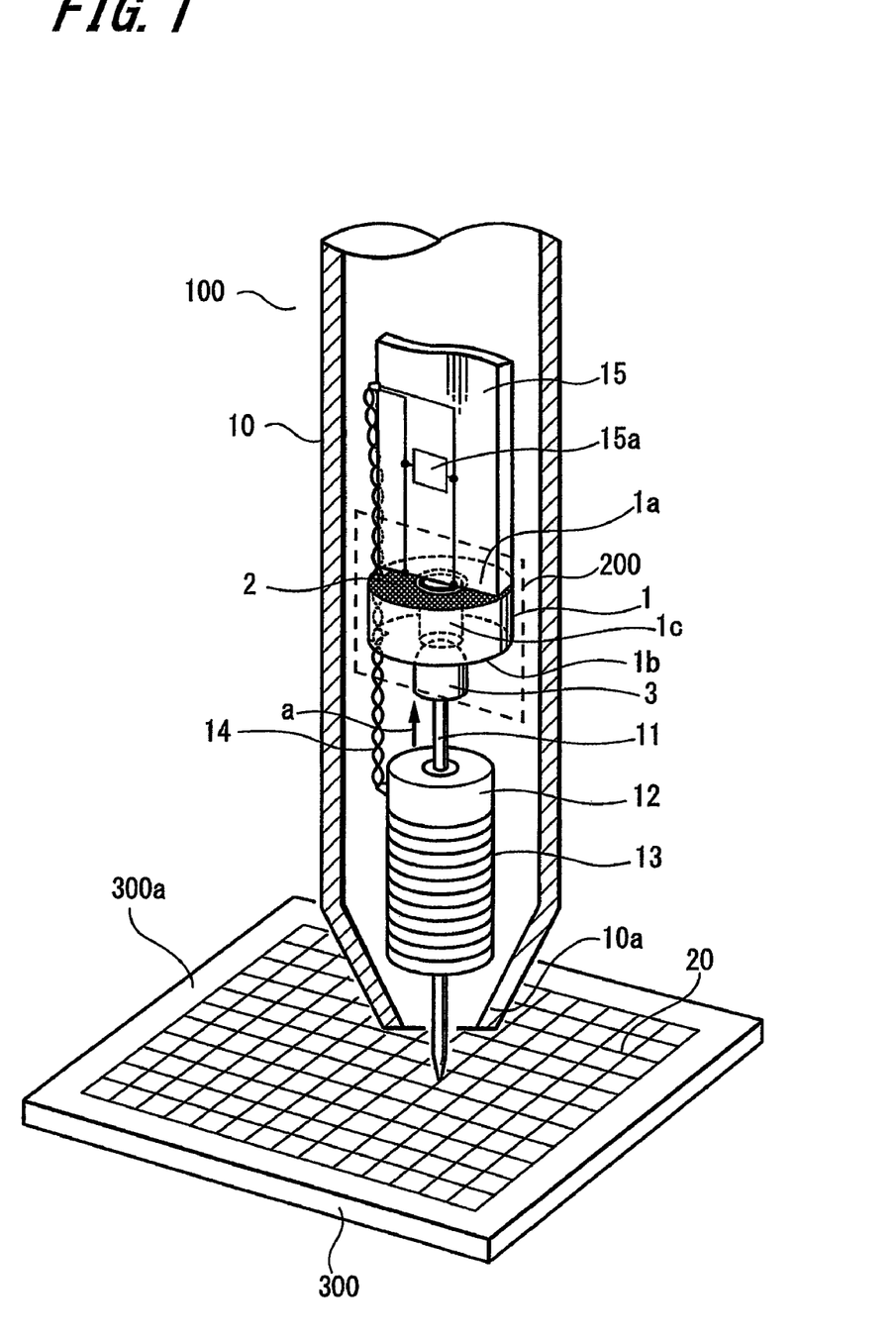
FIG. 1 is an illustration showing a configuration of an exemplary embodiment of a position indicator and a position input device according to the present invention.

The position input device includes a position indicator 100 and a tablet 300. The position indicator 100 is used at a position facing an upper surface 300a of the tablet 300. The tablet 300 is enabled to be connected to a personal computer (not shown). The tablet 300 detects the coordinates of a position indicated by the position indicator 100 and transmits the detected position coordinates to the personal computer. Based on the position coordinates transmitted from the tablet 300, the personal computer performs an input operation, such as a hand-drawn illustration input operation and/or a hand-written character input operation, with various software installed in the personal computer.

The position indicator 100 includes a variable capacitor 200, a rod 11, a ferrite core 12, a position indicating coil 13, lead wires 14, and a circuit board 15. All of these components are accommodated within a case 10 having a shape of a writing utensil such as a ball-point pen, a pencil, or the like.

The variable capacitor 200 includes a dielectric 1, an electrode 2, and a conductive elastic member 3. The dielectric 1 is formed in a predetermined shape such as a flat-disc shape having a hole 1c extending from one surface 1a thereof (hereinafter referred to as "upper surface 1a") to the other surface 1b thereof (hereinafter referred to as "lower surface 1b").

The dielectric 1 extends in an axial direction of the case 10. The electrode 2 is arranged on the upper surface 1a of the dielectric 1, and the conductive elastic member 3 is arranged facing the lower surface 1b of the dielectric 1. The electrode 2 forms one of a pair of electrodes constituting the variable capacitor 200, and the conductive elastic member 3 forms the other one of the pair of electrodes. The details of the configuration and operation of the variable capacitor 200 will be described later.

The rod 11 is an equivalent to a core of a writing utensil, such as an ink tube of a ball-point pen or a lead of a mechanical pencil. The rod 11 is an elongate member. When a user uses the position indicator 100 to perform a handwriting operation (for example, to handwrite a character) on the tablet 300, the rod 11 transmits its pen pressure to the conductive elastic member 3.

The rod 11 passes through a through-hole of the cylindrical ferrite core 12. One end of the rod 11 in a longitudinal direction is attached to the conductive elastic member 3. The other end of the rod 11 is formed in a substantially protruding shape. Specifically, the other end of the rod 11 protrudes toward the outside of the case 10 from a tip-end portion 10a of the case 10 to serve as a pen-tip for performing position indication. Although not shown in the drawings, when subjected to a pressure in the axial direction of the case 10, the rod 11 will be housed inside the case 10 in a state where the rod 11 moves in the direction of arrow "a".

The position indicating coil 13 is wound around the periphery of the ferrite core 12. The position indicating coil 13 constitutes a resonant circuit provided in the position indicator 100, and is connected in parallel with a resonant capacitor 15a through the lead wires 14. The resonant capacitor 15a constitutes the resonant circuit provided in the position indicator 100, and is mounted on the circuit board 15.

The tablet 300 transmits signals to the position indicator 100, and receives signals transmitted from the position indicator 100 to detect the position at or near which the position indication is performed. The tablet 300 includes a plurality of position detecting coils 20 parallel-arranged respectively in the X-axis direction and Y-axis direction at predetermined intervals.

The tablet 300 sequentially supplies signals having a specific frequency from the plurality of position detecting coils 20 to the position indicator 100, and sequentially detects, with the position detecting coils 20, resonance signals transmitted from the position indicating coil 13 of the position indicator 100. Further, the tablet 300 can detect both the position indicated by the position indicator 100 and the pen pressure, based on the position of the position detecting coils 20 being driven when the signals transmitted from the position indicator 100 are detected, and the strength of the resonance signals and the phase change of the resonance signals when the signals are detected.

Figure 2A:
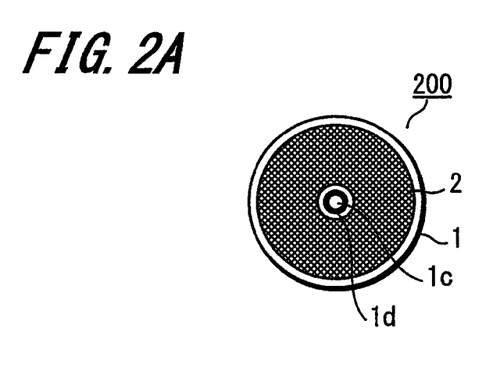
FIGS. 2A to 2D show a variable capacitor according to a first embodiment of the present invention.
Figure 2B:
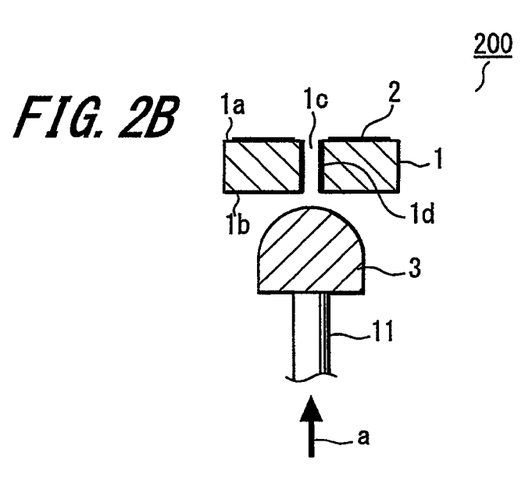
Figure 2C:
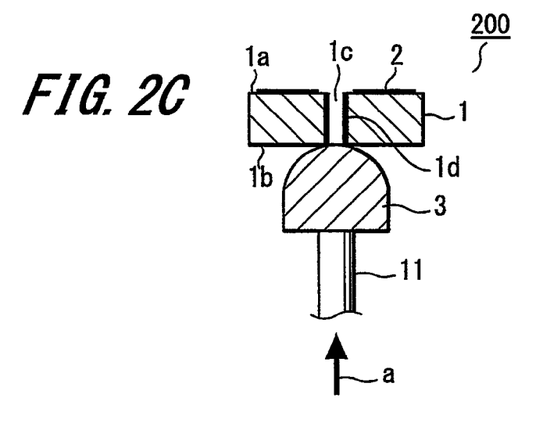

The configuration and operation principle of the variable capacitor 200 according to the first embodiment will be described below with reference to FIGS. 2A to 2D. FIG. 2A is a top view showing the variable capacitor 200 according to the present invention, FIG. 2B is a side view showing the same, and FIG. 2C is a side view showing the same in a state where a pen pressure is applied. Incidentally, in FIGS. 2A to 2D, components identical to those in FIG. 1 are denoted by the same reference numerals as in FIG. 1.

As shown in FIG. 2A, the dielectric 1 has the hole 1c formed substantially at the center thereof when viewed from the upper surface 1a, the hole 1c penetrating the dielectric 1 from the upper surface 1a to the lower surface 1b. Further, the electrode 2 is arranged on the upper surface 1a of the dielectric 1, the electrode 2 having a predetermined area which covers at least a part of the upper surface 1a other than the vicinity of an opening portion of the hole 1c. Further, a conductive layer 1d is provided on an inner wall of the hole 1c of the dielectric 1, the conductive layer 1d being formed, for example, by coating a conductive material on the inner wall of the hole 1c.

As shown in FIG. 2B, the conductive elastic member 3 is arranged facing an opening portion of the hole 1c on the side of the lower surface 1b of the dielectric 1. Further, the conductive elastic member 3 is arranged on the one end of the rod 11.

The operation of the variable capacitor 200 according to the present invention will be described below with reference to FIGS. 2B to 2D.

When the user uses the position indicator 100 to perform a handwriting operation, such as handwriting a character and/or handwriting an illustration (i.e., when the pen-tip contacts the upper surface 300a of the tablet 300), the stress of the force enacted on the surface 300a of the tablet 300 is transmitted to the conductive elastic member 3 through the rod 11 in the direction of arrow "a" in FIG. 2B. Consequently, the conductive elastic member 3 moves in the direction of arrow "a", so that the conductive layer 1d is brought into contact with the conductive elastic member 3 on the lower surface 1b at the opening portion of the hole 1c (see FIG. 2C).

Further, if the user increases the pen pressure, the force in the direction of arrow "a" will increase, and therefore the conductive elastic member 3 will be strongly pressed toward the lower surface 1b of the dielectric 1 so as to be deformed (namely, to be flattened). As a result, the area of the flattened portion of the conductive elastic member 3 contacting the lower surface 1b of the dielectric 1 will increase (see FIG. 2D). Consequently, the capacitance value between the electrode 2 and the conductive elastic member 3 will change in response to the change in the area of the conductive elastic member 3 contacting the electrode 2. Incidentally, if the pen-tip is moved away from the upper surface 300a of the tablet 300, due to the elastic restoring force of the conductive elastic member 3 and the weight of both the conductive elastic member 3 and the rod 11, the conductive elastic member 3 will also move away from the conductive layer 1d to be restored to its original state (see FIG. 2B).

Generally, capacitance "C" of a capacitor can be calculated by the following formula:

$$C = \varepsilon_o (S/d)$$

wherein: "∈o" represents the relative dielectric constant of the dielectric, "d" represents the distance between the two mutually faced electrodes of the capacitor, and "S" represents the area of the electrodes.

In the state shown in FIG. 2B, since the conductive elastic member 3 and the conductive layer 1d are physically separated from each other, the conductive elastic member 3 is not conductive to the conductive layer 1d, and therefore the capacitance of the variable capacitor 200 is zero. In the state shown in FIG. 2C, designating the contact area of the conductive elastic member 3 against the conductive layer 1d as "$S_1$", the capacitance "$C_1$" of the variable capacitor 200 can be calculated by the following formula:

$$C_1 = \varepsilon_o (S_1/d)$$

Figure 2D:
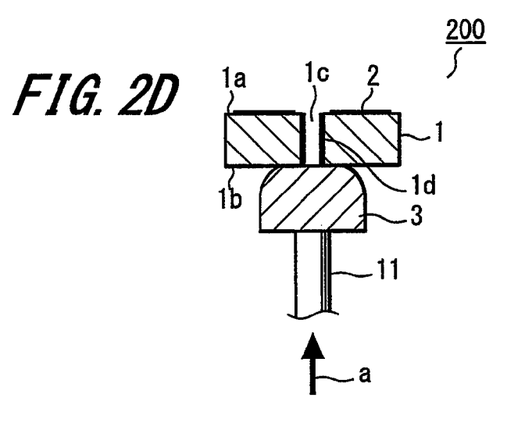

If the force applied to the conductive elastic member 3 further increases, then the conductive elastic member 3 will be pressed toward the lower surface 1b of the dielectric 1, and therefore the upper side of the conductive elastic member 3 will be deformed so as to become flattened, as shown in FIG. 2D. Designating the area of the flattened portion of the conductive elastic member 3 as "$S_2$", the capacitance "$C_2$" of the variable capacitor 200 can be calculated by the following formula:

$$C_2 = \varepsilon_o (S_2/d)$$

In such a manner, the capacitance of the variable capacitor 200 changes in response to the change in the area "S" of the conductive elastic member 3 facing the electrode 2.

A circuit configuration of an exemplary embodiment of the position indicator 100 and the tablet 300 according to the present invention will be described below with reference to FIG. 3.

The position indicator 100 has a resonant circuit configured with the position indicating coil 13, the resonant capacitor 15a and the variable capacitor 200.

On the other hand, the tablet 300 has a position detecting coil 20 configured by superposing an X-axis direction loop coil group 21a and a Y-axis direction loop coil group 21b. Each of the loop coil groups 21a and 21b is configured by sequentially overlapping forty rectangular loop coils, for example, so that the forty rectangular loop coils are shifted from each other at an equal interval. Further, the loop coil group 21a and the loop coil group 21b are connected to a selecting circuit 22 which sequentially selects a loop coil from the loop coil group 21a and the loop coil group 21b.

An AC signal having a frequency $f_0$ generated by an oscillator 23 is supplied to a current driver 24. The current driver 24 converts the AC signal into a current and sends the current to a transmission/reception switching circuit 25. The transmission/reception switching circuit 25 switches the connection to the loop coil selected by the selecting circuit 22 between the current driver 24 and a receiving amplifier 26. The receiving amplifier 26 amplifies an induced voltage generated by the selected loop coil and sent through the selecting circuit 22 and the transmission/reception switching circuit 25. The receiving amplifier 26 sends the amplified induced voltage to a detector 27 and a synchronous detector 31.

The detector 27 detects the induced voltage generated by the selected loop coil (in other words, the detector 27 detects a received signal) and sends the detected signal to a low-pass filter 28. The low-pass filter 28 has a cut-off frequency sufficiently lower than the aforesaid frequency $f_0$. The low-pass filter 28 converts the output signal from the detector 27 into a DC signal, and sends the DC signal to an S/H circuit (sample-and-hold circuit) 29. The S/H circuit 29 holds a voltage value of the output signal from the low-pass filter 28 at a predetermined timing (more specifically, at a predetermined time during a reception period), and sends the held value to an A/D conversion circuit (analog to digital conversion circuit) 30. The A/D conversion circuit 30 converts the output value from the S/H circuit 29 from analog to digital.

The synchronous detector 31 synchronously detects the output signal from the receiving amplifier 26 with the AC signal from the oscillator 23, and sends a signal, whose level varies according to a phase difference between the output signal and the AC signal, to a low-pass filter 32. The low-pass filter 32 has a cut-off frequency sufficiently lower than the frequency $f_0$. The low-pass filter 28 converts the output signal from the synchronous detector 31 into a DC signal, and sends the DC signal to an S/H circuit (sample-and-hold circuit) 33. The S/H circuit 33 holds a voltage value of the output signal from the low-pass filter 32 at a predetermined timing, and sends the held value to an A/D conversion circuit (analog to digital conversion circuit) 34. The A/D conversion circuit 34 converts the output value from the S/H circuit 33 from analog to digital.

A processing unit 35 is provided to control respective sections of the tablet 300. Specifically, the processing unit 35 respectively controls the selecting operation performed by the selecting circuit 22, the switching operation performed by the transmission/reception switching circuit 25, and the decision of the timing at which the S/H circuits 29 and 33 hold the voltage value. Further, based on input signals from the A/D conversion circuits 30 and 34, the processing unit 35 not only calculates the coordinate values of the indicated position of the position indicator 100 in the X-axis direction and the Y-axis direction based on the induced voltages obtained from respective loop coils of the X-axis direction loop coil group 21a and Y-axis direction loop coil group 21b after transmitting an electromagnetic wave for a predetermined period, but also detects the pen pressure based on the level of the signal which varies corresponding to the phase difference.

Figure 4:
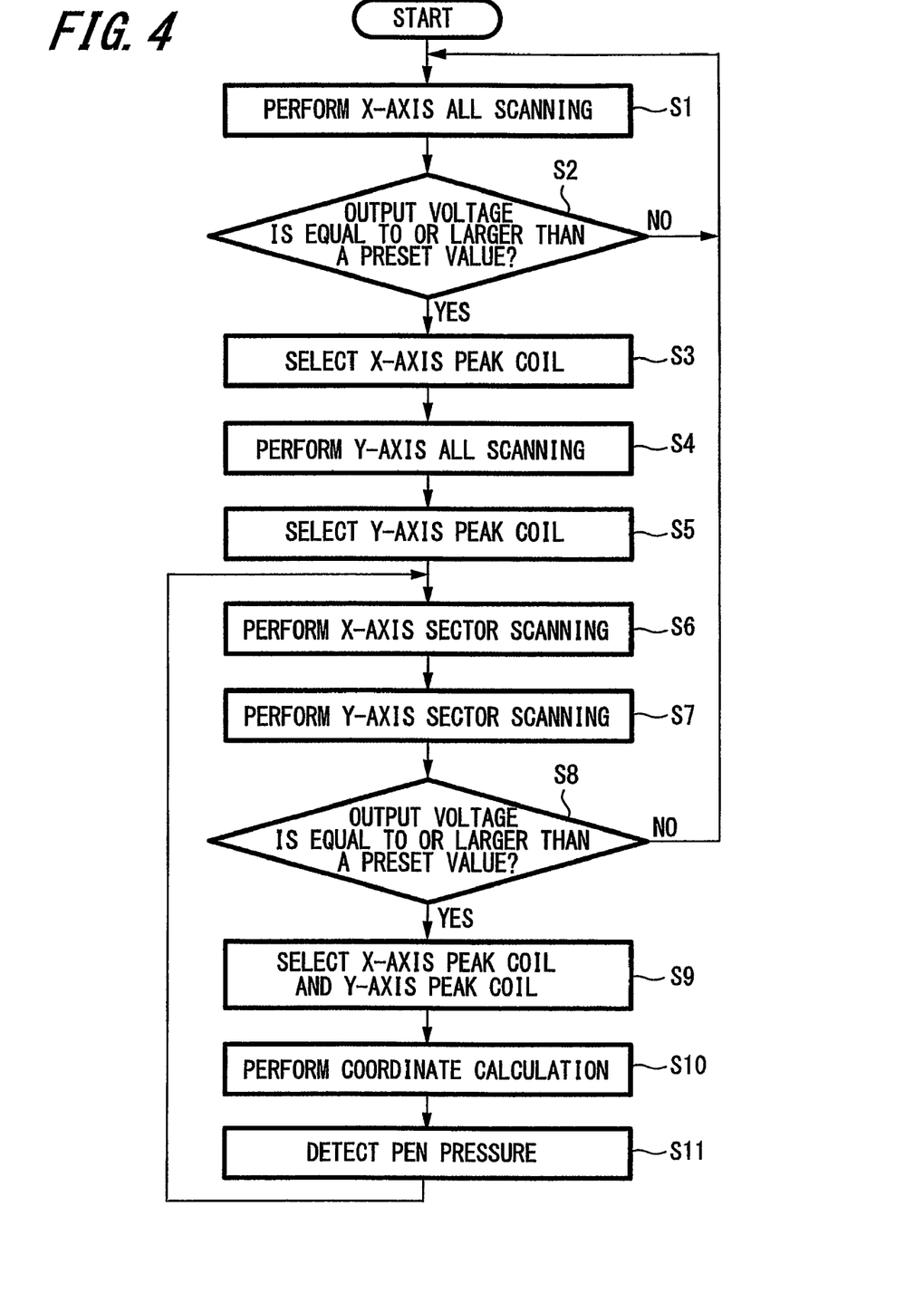
FIG. 4 is a flowchart showing processes executed by a processing unit of the position input device.

The operation of the tablet 300 will be described below with reference to FIG. 4, which is a flowchart showing processes executed by the processing unit 35.

Firstly, the processing unit 35 sends information to the selecting circuit 22 to make it select a first loop coil $X_1$, for example, from the X-axis direction loop coil group 21a, and sends a signal to the transmission/reception switching circuit 25 to make it select a transmission side, so that a sinusoidal signal having the frequency $f_0$ is supplied from the oscillator 23 to the loop coil $X_1$, such that an electromagnetic wave having the frequency $f_0$ is generated by the loop coil $X_1$. At this time, in a state where the position indicator 100 is located on the tablet 300, the electromagnetic wave having the frequency $f_0$ excites the resonant circuit configured with the position indicating coil 13, the resonant capacitor 15a and the variable capacitor 200, so that an induced voltage having the frequency $f_0$ is generated in the resonant circuit.

Then, after sending the signal to the transmission/reception switching circuit 25 to make it select the transmission side for a predetermined period, the processing unit 35 sends information to the transmission/reception switching circuit 25 to make it select a reception side, such that the electromagnetic wave generation by the loop coil $X_1$ is ceased. At this time, the induced voltage generated in the resonant circuit of the position indicator 100 attenuates gradually while the position indicator 100 transmits an electromagnetic wave having the frequency $f_0$. The electromagnetic wave having the frequency $f_0$ transmitted from the position indicator 100 in turn excites the loop coil $X_1$ to generate an induced voltage.

After sending the signal to the transmission/reception switching circuit 25 to make it select the reception side for a predetermined period, the processing unit 35 sends a signal to the selecting circuit 22 to make it select a second loop coil $X_2$, for example, from the X-axis direction loop coil group 21a, and performs transmission/reception of electromagnetic waves in the same manner as mentioned above. Thereafter, 3rd to 40th loop coils $X_3$ to $X_{40}$, for example, of the X-axis direction loop coil group 21a are sequentially scanned/selected (i.e., a total (all) scanning is performed with the loop coils $X_3$ to $X_{40}$) to perform transmission/reception of electromagnetic waves in the same manner as described above (Step S1).

Incidentally, the aforesaid sequential scanning/selecting (i.e., all-scanning) does not have to be performed with every loop coil of the X-axis direction loop coil group 21a, but can be performed with every other loop coil, every third loop coil, or the like. Further, in the aforesaid sequential scanning/selecting (i.e., all-scanning), transmission/reception of electromagnetic waves may be performed plural times to one loop coil. Furthermore, while in the aforesaid sequential scanning/selecting (i.e., all-scanning) mode, transmission time for each loop coil and reception time for each loop coil respectively were described as the same, but the transmission time and the reception time do not have to be equal to each other. Incidentally, in the following description, operation of performing the sequential scanning/selecting (i.e., all-scanning) to all loop coils of the X-axis direction loop coil group 21a is referred to as "X-axis all scanning", and operation of performing the sequential scanning/selecting (i.e., all-scanning) to all loop coils of the Y-axis direction loop coil group 21b is referred to as "Y-axis all scanning".

The induced voltage (i.e., the received signal) generated in the loop coil of the X-axis direction loop coil group 21a during the reception period is detected by the detector 27 to be converted into the DC signal, smoothed by the low-pass filter 28, held by the S/H circuit 29 at the predetermined timing, and sent, through the A/D conversion circuit 30, to the processing unit 35 as the voltage value.

Figure 5:
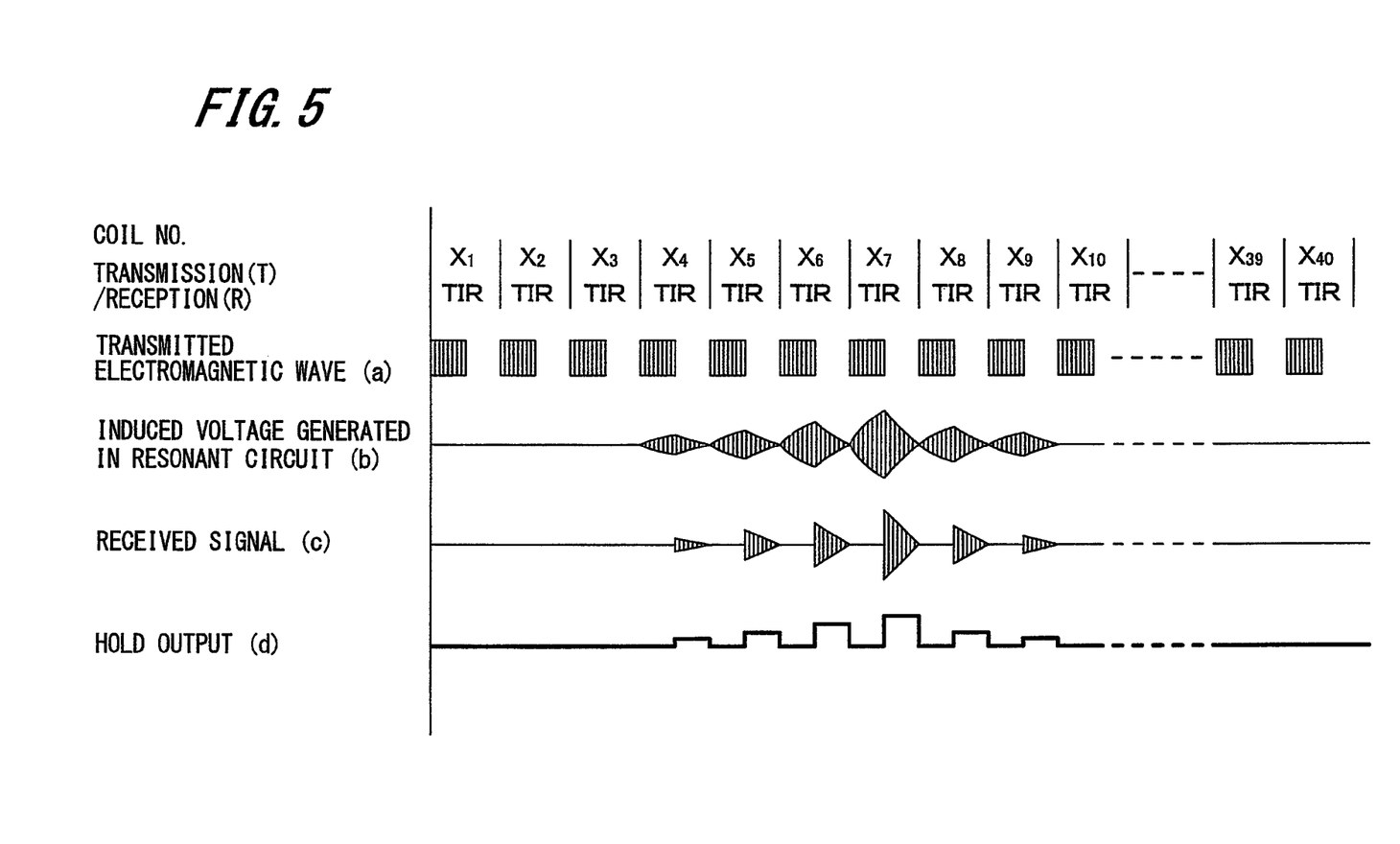
FIG. 5 is a waveform diagram showing an example of waveforms of respective sections of the position indicator and the position input device while performing an X-axis total (all) scanning.

FIG. 5 is a waveform diagram showing an example of waveforms of respective sections of the position indicator 100 and the tablet 300 while the X-axis all scanning is performed, where (a) represents the electromagnetic wave transmitted from the position detecting coil 20, (b) represents the induced voltage generated in the resonant circuit, (c) represents the received signal, and (d) represents the output signal from the S/H circuit 29.

The output level of the S/H circuit 29 depends on the distance between the position indicator 100 and the loop coil. The processing unit 35 determines whether or not the maximum value of the output level of the S/H circuit 29 is equal to or larger than a preset value, to thereby determine whether or not the position indicator 100 is located within an effective reading height range of the tablet 300 (Step S2).

If it is determined that the position indicator 100 is located within the effective reading height range of the tablet 300, then the processing unit 35 selects, among the loop coils, an X-axis direction loop coil causing the maximum value of the output level of the S/H circuit 29 (such a loop coil is referred to as a "peak coil" hereinafter). Further, the processing unit 35 stores the coil number of the peak coil (Step S3). In the example of FIG. 5, the coil number of the peak coil is $X_7$. Incidentally, If it is determined that the position indicator 100 is not located within the effective reading height range of the tablet 300, then the processing unit 35 repeats the process of Steps S1 and S2.

Figure 6:
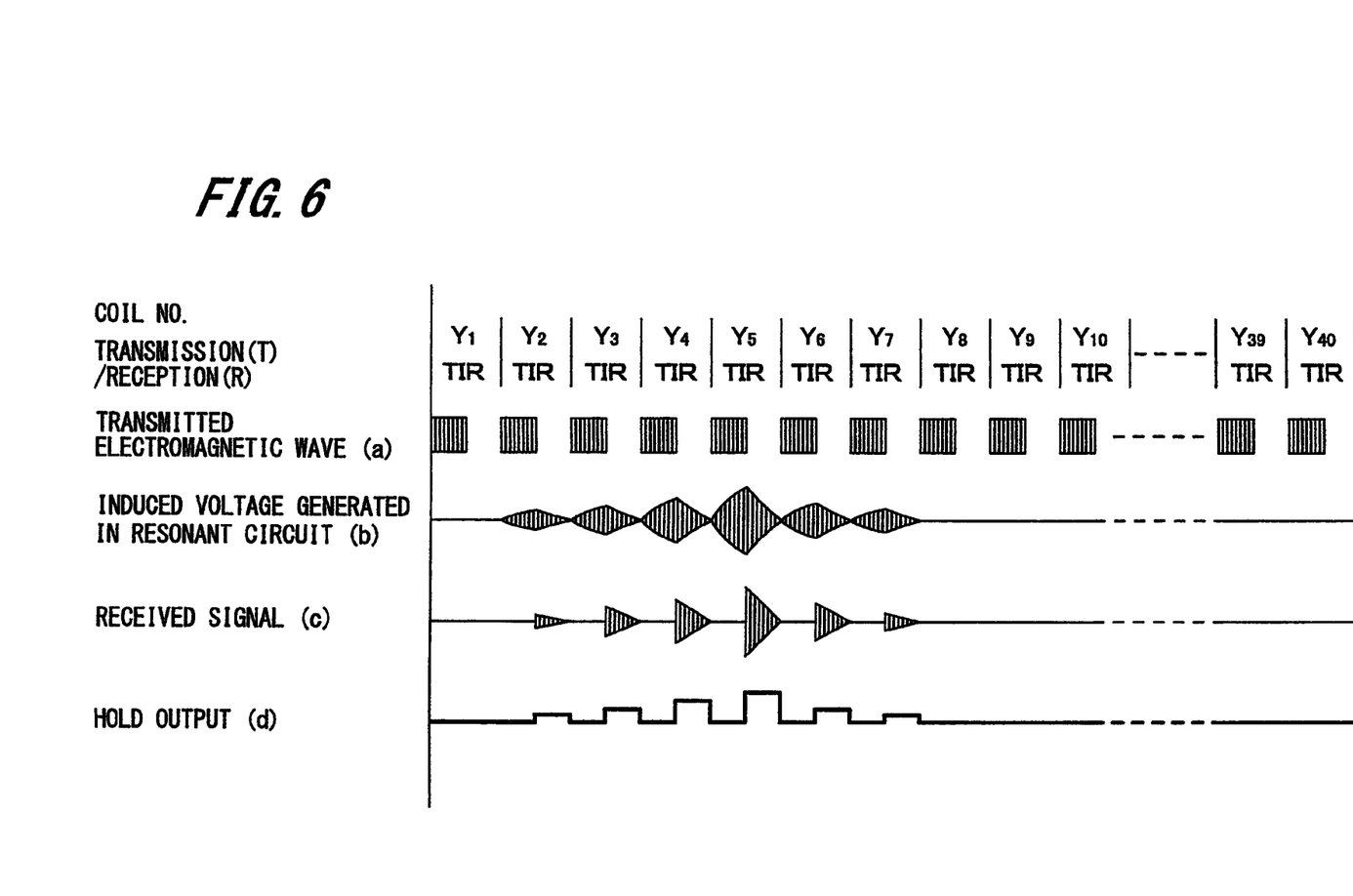
FIG. 6 is a waveform diagram showing an example of waveforms of respective sections of the position indicator and the position input device while performing a Y-axis total (all) scanning.

In the same manner as described above, the processing unit 35 sequentially scans/selects each loop coil of the Y-axis direction loop coil group 21b to perform the transmission/reception of electromagnetic waves in the same manner as described above (Step S4), and further, the processing unit 35 selects the peak coil in the Y-axis direction and stores the coil number of the peak coil (Step S5). In the example of FIG. 6, the coil number of the peak coil is $Y_5$. FIG. 6 is a waveform diagram showing an example of waveforms of respective sections of the position indicator 100 and the tablet 300 while performing the Y-axis all scanning, where each of the signals represents the same meaning as indicated in FIG. 5.

Next, the processing unit 35 performs transmission/reception of electromagnetic waves with a predetermined number of loop coils (for example, five loop coils) of the X-axis direction loop coil group 21a with the peak coil positioned at the center. Here, in performing the transmission/reception of electromagnetic waves with the aforesaid five loop coils, when performing transmission of electromagnetic waves (i.e., when the transmission/reception switching circuit 25 selects the transmission side), the peak coil (in this example the loop coil $X_7$) is constantly selected; while when performing reception of electromagnetic waves (i.e., when the transmission/reception switching circuit 25 selects the reception side), the sequential scanning/selecting (i.e., sector scanning) is sequentially performed in ascending order from the smallest coil number to the largest coil number (or in descending order from the largest coil number to the smallest coil number) (Step S6). Hereinafter, operation of performing transmission/reception of electromagnetic waves with a predetermined number of loop coils of the X-axis direction loop coil group 21a with the peak coil positioned at the center is referred to as "X-axis sector scanning".

After the X-axis sector scanning is completed, the processing unit 35 performs transmission/reception of electromagnetic waves with a predetermined number of loop coils (for example, five loop coils) of the Y-axis direction loop coil group 21b with the peak coil positioned at the center. Here, in performing transmission/reception of electromagnetic waves with the aforesaid five loop coils, when performing transmission of electromagnetic waves (i.e., when the transmission/reception switching circuit 25 selects the transmission side), the peak coil (in this example the loop coil $Y_5$) is constantly selected; while when performing reception of electromagnetic waves (i.e., when the transmission/reception switching circuit 25 selects the reception side), the sequential scanning/selecting (i.e., sector scanning) is sequentially performed in ascending order from the smallest coil number to the largest coil number (or in descending order from the largest coil number to the smallest coil number) (Step S7). Hereinafter, operation of performing transmission/reception of electromagnetic waves with a predetermined number of loop coils of the Y-axis direction loop coil group 21a with the peak coil positioned at the center is referred to as "Y-axis sector scanning".

Figure 7:
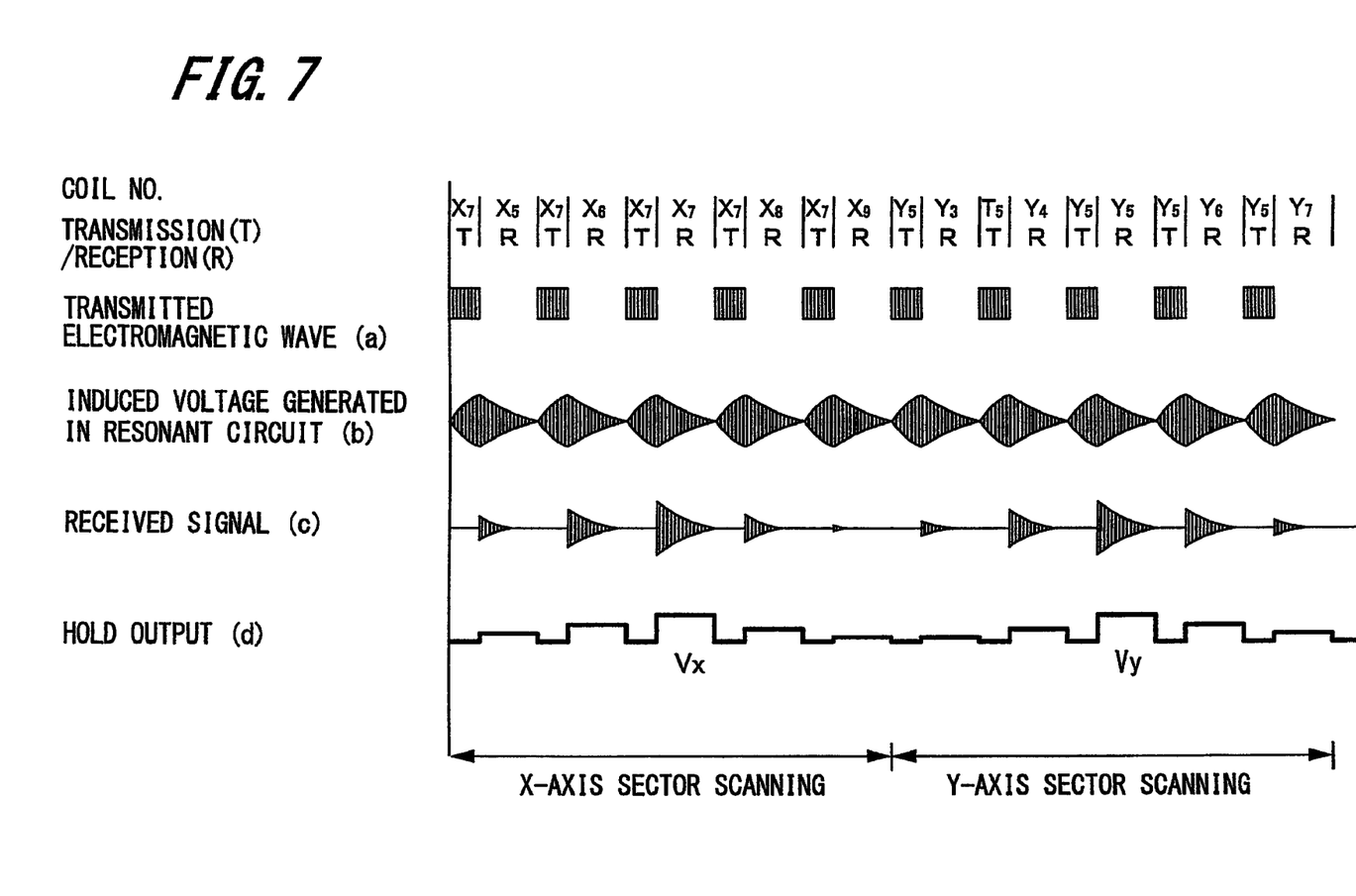
FIG. 7 is a waveform diagram showing an example of waveforms of respective sections of the position indicator and the position input device while performing an X-axis sector scanning and a Y-axis sector scanning.

FIG. 7 is a waveform diagram showing an example of waveforms of respective sections of the position indicator 100 and the tablet 300 while performing the X-axis sector scanning and the Y-axis sector scanning, where each of the signals represents the same meaning as indicated in FIGS. 5 and 6.

After the X-axis sector scanning and the Y-axis sector scanning are completed, the processing unit 35 determines again whether or not the maximum value of the induced voltage obtained from the loop coil is equal to or larger than the preset value, to thereby determine whether or not the position indicator 100 is located within the effective reading height range of the tablet 300 (Step S8). In Step S8, if the processing unit 35 determines that the position indicator 100 is located within the effective reading height range of the tablet 300, then the X-axis peak coil and the Y-axis peak coil which are respectively generating the maximum induced voltage value in the X-axis direction and Y-axis direction are selected and stored (Step S9).

The processing unit 35 extracts a plurality of induced voltages (for example, three induced voltages), in descending order from high level to low level, respectively from the X-axis sector scanning and the Y-axis sector scanning, and conducts, based on the extracted signals, a coordinate calculation according to a well-known method disclosed in Japanese Patent No. 2131145, corresponding to U.S. Pat. No. 4,878,553, incorporated by reference herein, to obtain a coordinate value in the X-axis direction and a coordinate value in the Y-axis direction (Step S10). After conducting the coordinate calculation, the processing unit 35 detects the pen pressure based on the level of the signal which varies corresponding to the phase difference (Step S11).

Then, if the position indicator 100 keeps locating the position indicator 100 within the effective reading height range of the tablet 300, then the processing unit 35 repeats the process of Steps S6 to S11; and if it is determined that the position indicator 100 is not located within the effective reading height range of the tablet 300, then the processing unit 35 returns to the process of Step S1.

In such a manner, the processing unit 35 can detect the position where the position indicator 100 is, or is (close to (or near). Also, by detecting the phase of the received signal, the processing unit 35 can obtain information about the pen pressure value of the position indicator 100. Further, since a central processing unit capable of performing arithmetic/mathematical processes based on an arbitrary program can be used as the processing unit 35, FIG. 3 also can be viewed as a block diagram schematically showing a computer system which performs arithmetic/mathematical processes based on information about the position where the position indicator 100 is, or is near, relative to the tablet 300.

Since the variable capacitor 200 of the present invention can be configured using only the conductive elastic member 3 and the flat shaped dielectric 1, which has the electrode 2 provided on the upper surface 1a thereof and the conductive layer 1d provided on the inner wall of the hole 1c therethrough, the variable capacitor 200 of the present invention can be configured with an extremely small number of components. Incidentally, a silicone conductive rubber, a pressure sensitive conductive rubber (PRC), or the like, can be used to form the conductive elastic member 3.

With such a configuration, since the elements (such as terminals 206 and 207 shown in FIGS. 10A and 10B) necessary for forming a known configuration are eliminated, the outer diameter of the variable capacitor can be reduced from approximately 7 mm (which represents an outer diameter of the known variable capacitor) to approximately 5 mm (which represents an outer diameter of the variable capacitor according to various exemplary embodiments of the present invention). Thus, in a case where the structure other than the variable capacitor is the same, the radial dimension of the position indicator can be reduced from 9 mm (which represents a radial dimension of the known position indicator) to 7 mm (which represents a radial dimension of the position indicator according to various exemplary embodiments of the present invention). Further, in a case where the radial dimension of the position indicator is set to 9 mm (i.e., set to the same size as the known position indicator), the margin of 2 mm can be used to install a reinforcing member or a buffer member, for example, to improve durability and impact resistance of the position indicator.

Figure 3:
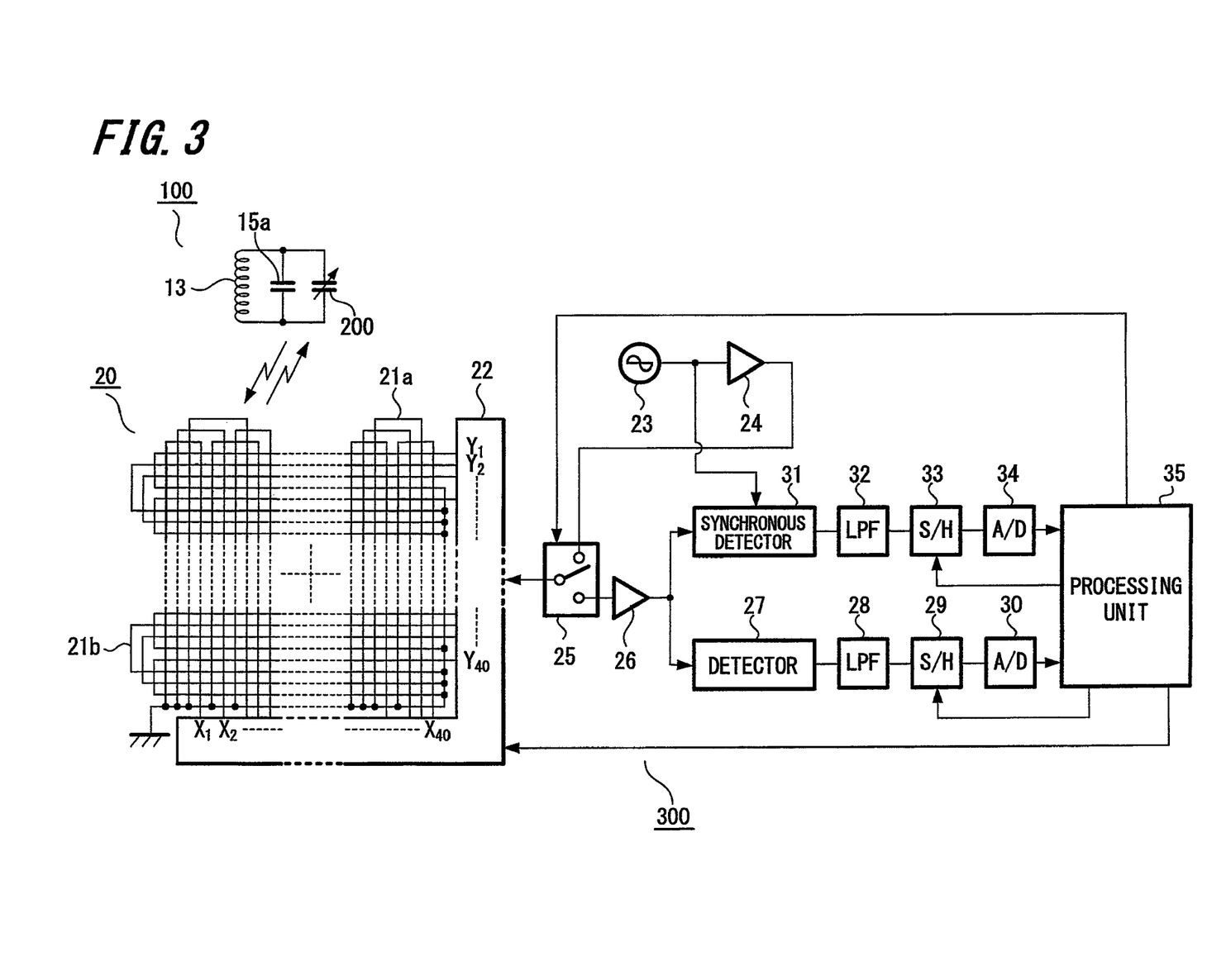
FIG. 3 is a block diagram schematically showing an exemplary circuit configuration of the position indicator and the position input device.
Figure 8:
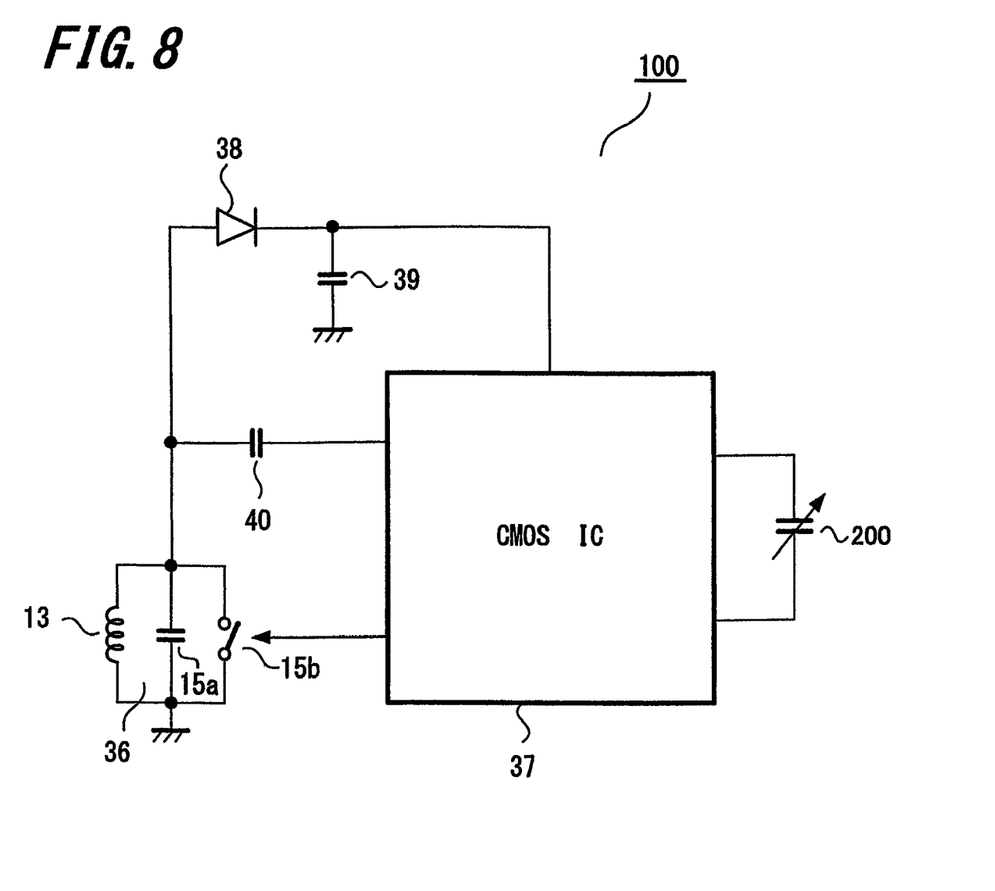
FIG. 8 is a circuit diagram showing a configuration of another exemplary embodiment of the position indicator.

Another exemplary embodiment of the position indicator different from that which is shown in FIG. 3 will be described below with reference to FIG. 8. FIG. 8 schematically shows another configuration of the circuit diagram of the position indicator 100. Incidentally, in FIG. 8, components identical to those in FIG. 3 are denoted by the same reference numerals as in FIG. 3, and detailed explanations thereof will be omitted.

A position indicating coil 13 and a resonant capacitor 15a form a resonant circuit 36, which resonates at a frequency $f_0$ output from the position detecting coil 20 provided in the tablet 300. Further, an integrated circuit 37 based on well-known CMOS technology is mounted on the circuit board 15 shown in FIG. 1. The integrated circuit 37 is driven by a driving power generated by a diode 38 and a capacitor 39.

The diode 38 is connected to the resonant circuit 36. Further, an AC voltage generated in the resonant circuit 36 based on an excitation signal supplied from the position detecting coil 20 is applied to the diode 38. The AC voltage is rectified by the diode 38 and the capacitor 39 and converted into a DC voltage so as to serve as the driving power for driving the integrated circuit 37. Further, the signal generated by the resonant circuit 36 is supplied to the integrated circuit 37 through a capacitor 40. Based on the signal supplied through the capacitor 40, the integrated circuit 37 generates a clock signal for sending/receiving signals between the position indicator 100 and the tablet 300 and a clock signal for detecting the pen pressure.

As described above, the capacitance of the variable capacitor 200 changes in response to the pen pressure. The variable capacitor 200 is connected to a resistor (not shown) to form a time-constant circuit. Since the capacitance of the variable capacitor 200 changes in response to the pen pressure, the time constant of the time-constant circuit also changes. Further, the number of waves of the signal generated by the resonant circuit 36 is counted by the integrated circuit 37 during the time period corresponding to the time constant. The counted value (i.e., the number of waves counted during the time period) is converted to the pen pressure value represented in a predetermined bit number (for example, 8 bits).

The pen pressure data obtained in such a manner is output from the integrated circuit 37 bit by bit in synchronization with the clock signal, which is provided for sending/receiving signals between the position indicator 100 and the tablet 300, to control a switch 15b connected in parallel to the resonant circuit 36. Thus, when the switch 15b is turned off (open), the signal output from the position indicator 100 can be detected by the tablet 300; while when the switch 15b is turned on (closed), since the resonant circuit 36 is short-circuited, the signal output from the position indicator 100 can not be detected.

Thus, in the tablet 300, the pen pressure can be obtained by detecting the signal transmitted from the position indicator 100 after the excitation signal from the position detecting coil 20 has been transmitted for a predetermined period of time.

According to various exemplary embodiments, the position indicator, the position input device, and the computer system according to the present invention are provided with a variable capacitor which includes a dielectric having two mutually opposite surfaces; an electrode arranged on one surface of the dielectric and having a predetermined area, a hole penetrating the two mutually opposite surfaces of the dielectric, a conductive portion for electrically connecting both ends of the hole to one another, and a conductive elastic member arranged near the other surface of the dielectric. Accordingly, the configuration of the variable capacitor serving as the pen pressure detecting section can be simplified, and therefore the radial dimension of the position indicator can be reduced.

Figure 9:
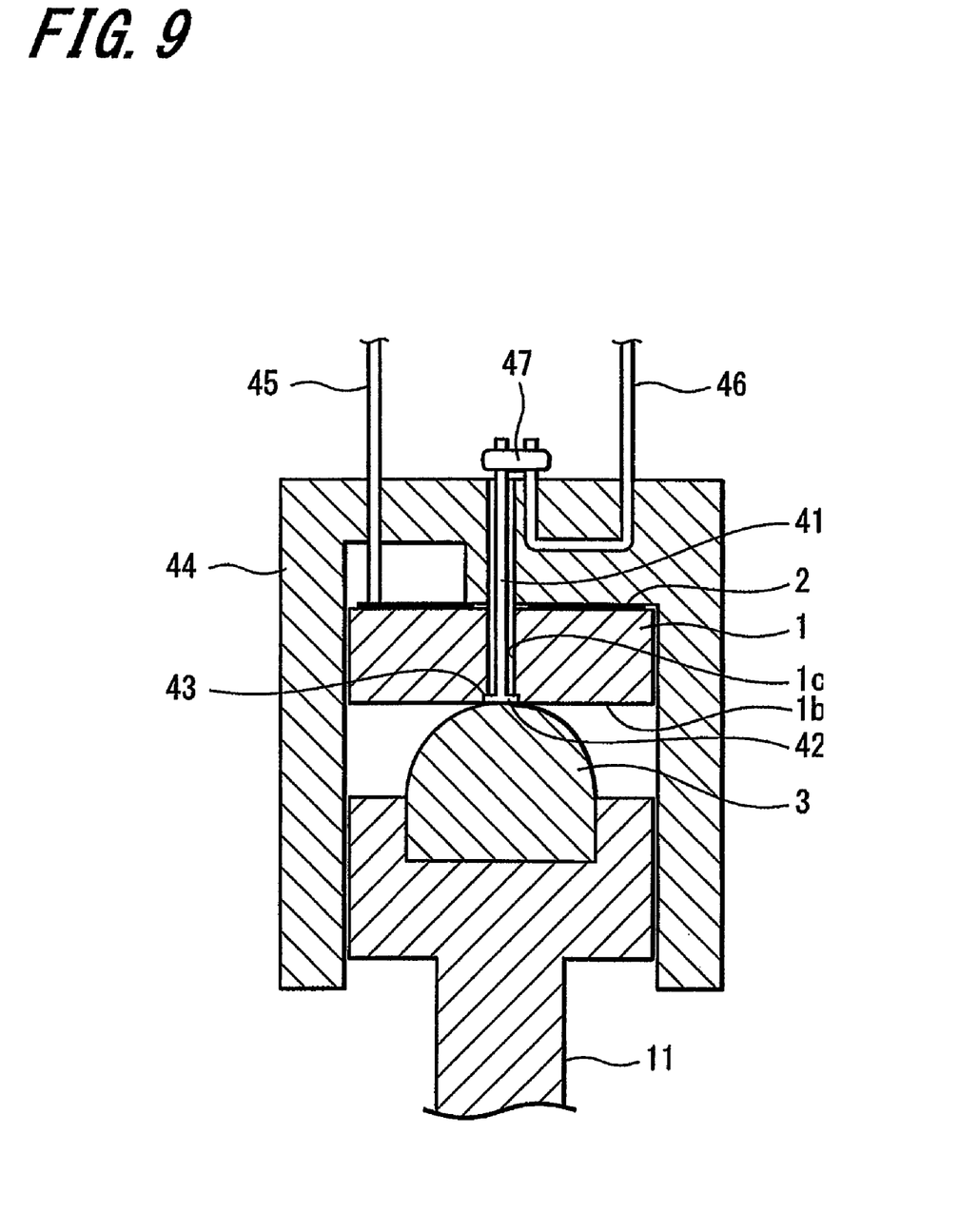
FIG. 9 is a cross section showing a variable capacitor according to a second embodiment.

A configuration of a variable capacitor according to a second embodiment of the present invention will be described below with reference to FIG. 9. FIG. 9 is a cross section showing the variable capacitor. In FIG. 9, components identical to those in FIGS. 2A to 2D are denoted by the same reference numerals as in FIGS. 2A to 2D, and detailed explanations thereof will be omitted.

According to the second embodiment, a conductive pin 41 is inserted into the hole 1c of the dielectric 1, instead of the conductive layer 1d provided on the inner wall of the hole 1c. When the conductive pin 41 contacts the conductive elastic member 3, the conductive elastic member 3 is brought into electrical connection with the resonant circuit via the conductive pin 41. One end of the conductive pin 41 in the longitudinal direction is provided with a pin head portion 42. A stepped portion 43 is formed on the lower surface 1b of the dielectric 1. The stepped portion 43 is a recessed portion recessed around the hole 1c. The depth of the stepped portion 43 is equal to or slightly greater than the thickness of the pin head portion 42 so that the pin head portion 42 of the conductive pin 41 can be fitted into the stepped portion 43. The other end of the conductive pin 41 in the longitudinal direction is inserted into the hole 1c from an opening of the hole 1c on the side of the stepped portion 43. When the conductive pin 41 is inserted further toward the upper surface 1a of the dielectric 1, the pin head portion 42 of the conductive pin 41 will be fitted into the stepped portion 43 so that the end portion of the pin head portion 42 is flush with the lower surface 1b or slightly recessed from the lower surface 1b.

In the second embodiment, the dielectric 1, the conductive elastic member 3, and the conductive pin 41 are accommodated in a sleeve 44 formed by injection molding, for example. One end portion of the sleeve 44 in the longitudinal direction is open, and the sleeve 44 has a hollow internal portion for accommodating the dielectric 1, the conductive elastic member 3, and the conductive pin 41. The other end portion of the sleeve 44 in the longitudinal direction is a closed end portion having through-holes formed therein to allow the conductive pin 41, the lead member 45, and the lead member 46 to protrude toward the outside of the sleeve 44. The conductive elastic member 3 provided on one end portion of the rod 11 is inserted from the open end portion of the sleeve 44.

The lead member 45 and the lead member 46 for connecting the variable capacitor 200 to the resonant circuit are arranged on the closed end portion of the sleeve 44. Specifically, the lead member 45 and the lead member 46 penetrate the closed end portion of the sleeve 44. One end of the lead member 45 is brought into contact with the electrode 2 provided on the upper surface 1a of the dielectric 1 inserted from the open end portion of the sleeve 44. The other end of the lead member 45 is electrically connected to the resonant circuit. One end of the lead member 46 is brought into connection with the conductive pin 41 protruding from the closed end portion of the sleeve 44 by a weld 47. The other end of the lead member 46 is electrically connected to the resonant circuit. By detecting the capacitance value between the lead member 45 and the lead member 46, the pen pressure applied to the rod 11 can be detected.

As described above, in the second embodiment, the variable capacitor serving as the pen pressure detecting section is configured with only four components, which are the rod 11 having the conductive elastic member 3 attached thereto, the flat shaped dielectric 1, the sleeve 44 formed by injection molding and having the lead members 45 and 46 provided therein, and a conductive pin 41. Therefore, the variable capacitor according to the second embodiment can also have an extremely simple configuration. Further, since the elements (such as terminals 206 and 207 shown in FIGS. 10A and 10B) necessary for forming a known configuration are eliminated, the outer diameter of the variable capacitor can be reduced.

Thus, according to the second embodiment, since the configuration of the variable capacitor serving as the pen pressure detecting section is simplified, the radial dimension of the position indicator, in particular, can be easily reduced.

It should be noted that the present invention is not limited to the above embodiments but includes various modifications and examples without departing from the spirit and objects of the present invention.

What is claimed is:

1. A position indicator comprising:
   a variable capacitor;
   a resonant circuit configured with a position detecting coil and a capacitor connected with the variable capacitor; and
   a rod passing through the position detecting coil, wherein the variable capacitor includes a dielectric having two mutually opposite surfaces, an electrode arranged on one surface of the dielectric and having a predetermined area, a hole penetrating through the dielectric between the two mutually opposite surfaces of the dielectric, a conductive portion electrically connecting both ends of the hole to one another, and a conductive elastic member arranged near the other surface of the dielectric, and wherein one end of the rod is connected to the conductive elastic member, and the other end of the rod serves as a position-indicating point.

2. The position indicator according to claim 1, wherein the conductive portion is formed by inserting a conductive pin into the hole.

3. The position indicator according to claim 2, wherein one end portion of the conductive pin in a longitudinal direction is provided with a flat pin head portion, and the other surface of the dielectric is provided with a stepped portion recessed around the hole, the depth of the stepped portion being equal to or slightly greater than the thickness of the pin head portion.

4. The position indicator according to claim 1, wherein the conductive portion is formed by forming a conductive layer on an inner wall of the hole.

5. The position indicator according to claim 1, wherein a contact area of the conductive elastic member and the dielectric changes in response to a pen pressure applied to the rod.

6. A variable capacitor comprising:
a dielectric having two mutually opposite surfaces;
an electrode arranged on one surface of the dielectric and having a predetermined area;
a hole penetrating through the dielectric between the two mutually opposite surfaces of the dielectric;
a conductive portion electrically connecting both ends of the hole to one another; and
a conductive elastic member arranged near the other surface of the dielectric.

7. The variable capacitor according to claim 6, wherein the conductive portion is formed by inserting a conductive pin into the hole.

8. The variable capacitor according to claim 7, wherein one end portion of the conductive pin in a longitudinal direction is provided with a flat pin head portion, and the other surface of the dielectric is provided with a stepped portion recessed around the hole, the depth of the stepped portion being equal to or slightly greater than the thickness of the pin head portion.

9. The variable capacitor according to claim 6, wherein the conductive portion is formed by forming a conductive layer on an inner wall of the hole.

10. The variable capacitor according to claim 6, wherein the conductive elastic member has a predetermined hardness so as to deform and change a contact area with the dielectric in response to a pressure applied to the conductive elastic member.

11. The variable capacitor according to claim 6, wherein the dielectric has a flat shape.

12. A position input device comprising:
a position indicator; and
a position detector,
wherein the position indicator includes: a variable capacitor; a resonant circuit configured with a position detecting coil and a capacitor connected with the variable capacitor; and a rod passing through the position detecting coil, where the variable capacitor has a dielectric having two mutually opposite surfaces, an electrode arranged on one surface of the dielectric and having a predetermined area, a hole penetrating through the dielectric between the two mutually opposite surfaces of the dielectric, a conductive portion electrically connecting both ends of the hole to one another, and a conductive elastic member arranged near the other surface of the dielectric, and where one end of the rod is connected to the conductive elastic member, and the other end of the rod serves as a position-indicating point, and wherein the position detector detects, near the position-indicating point, a signal transmitted from the position detecting coil.

13. The position input device of claim 12, which is further configured to detect a pen pressure applied to the rod.

14. The position input device of claim 13, wherein a pen pressure is reflected in a phase difference between a signal transmitted from the position detector and a signal received by the position detector from the resonant circuit.

15. The position input device of claim 13, wherein the variable capacitor is formed as part of a time-constant circuit, and a pen pressure is reflected in a number of waves generated by the resonant circuit during a time period corresponding to a time constant of the time-constant circuit.

16. A computer system including a central processing unit, the system comprising:
a position indicator; and
a position detector,
wherein the position indicator includes: a variable capacitor; a resonant circuit configured with a position detecting coil and a capacitor connected with the variable capacitor; and a rod passing through the position detecting coil, where the variable capacitor has a dielectric having two mutually opposite surfaces, an electrode arranged on one surface of the dielectric and having a predetermined area, a hole penetrating through the dielectric between the two mutually opposite surfaces of the dielectric, a conductive portion electrically connecting both ends of the hole to one another, and a conductive elastic member arranged near the other surface of the dielectric, and where one end of the rod is connected to the conductive elastic member, and the other end of the rod serves as a position-indicating point, wherein the position detector detects, near the position-indicating point, a signal transmitted from the position detecting coil, and wherein the computer system converts a pen pressure detected by the variable capacitor into a data signal, using the central processing unit.

17. The computer system of claim 16, wherein a pen pressure is reflected in a phase difference between a signal transmitted from the position detector and a signal received by the position detector from the resonant circuit.

18. The computer system of claim 16, wherein the variable capacitor is formed as part of a time-constant circuit, and a pen pressure is reflected in a number of waves generated by the resonant circuit during a time period corresponding to a time constant of the time-constant circuit.

* * * * *